April 2, 1935. J. M. G. FULLMAN 1,996,371
UNDERFLOOR DUCT SYSTEM
Filed Dec. 4, 1931 2 Sheets-Sheet 2
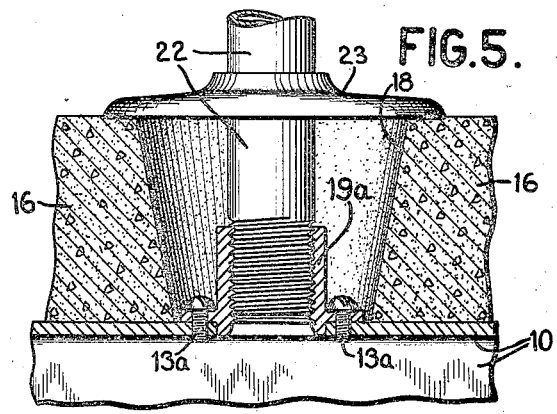
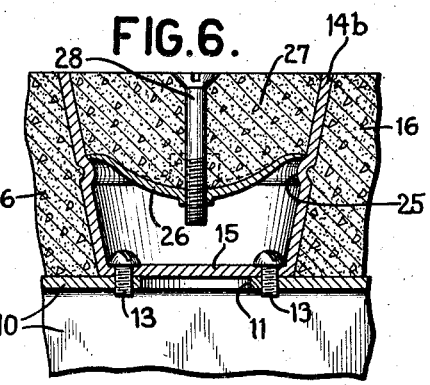
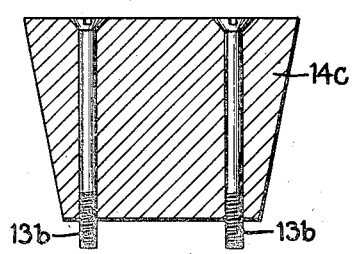
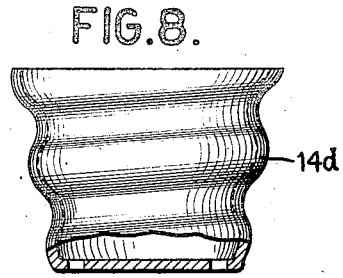
James M. G. Fullman
INVENTOR
BY his ATTORNEYS
Cooper, Kerr & Dunham Patented Apr. 2, 1935

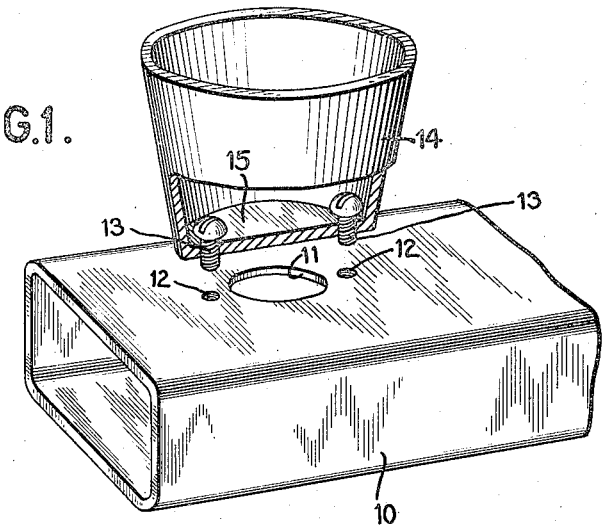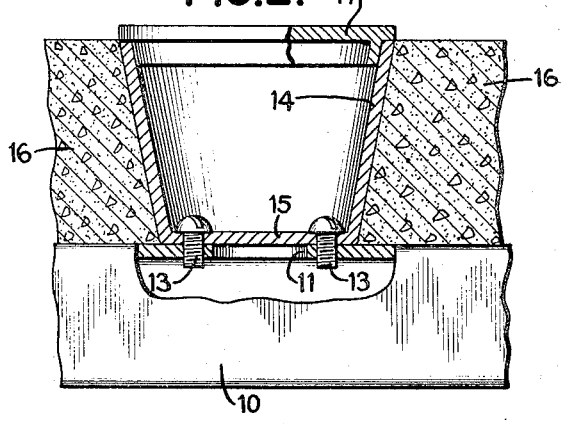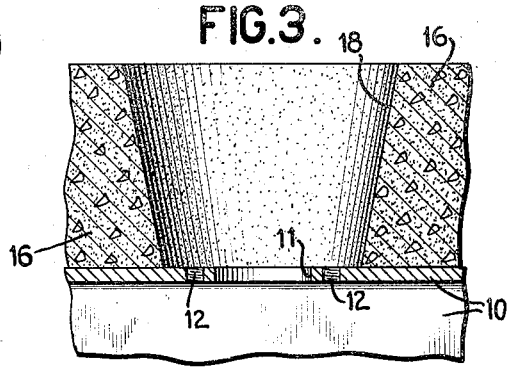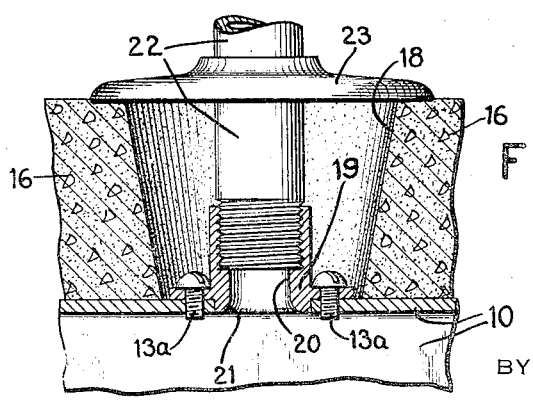

1,996,371

UNITED STATES PATENT OFFICE 1,996,371

UNDERFLOOR DUCT SYSTEM

James M. G. Fullman, Sewickley, Pa., assignor to National Electric Products Corporation, New York, N. Y., a corporation of Delaware Application December 4, 1931, Serial No. 578,927

4 Claims. (Cl. 247—28)

This invention relates to an improved underfloor duct system and to improved means for providing outlets. More particularly the present invention relates to an improvement in the construction disclosed in United States patent to Otto A. Fredrickson, No. 1,776,656, dated September 23, 1930. According to the arrangement therein set forth, forms in the shape of plugs were provided which were attached to ducts or conduits and after such forms were removed, the duct proper had to have a section thereof removed to provide access to the interior of the duct. Difficulty is sometimes experienced in removing the duct material through the pre-formed opening to the floor surface and in certain cases the opening in the duct must be reamed or other operations thereon performed in order that an outlet fixture may be attached thereto.

The present invention has for one of its objects the provision of an improved construction wherein, as before, removable plug-shaped forms are provided which forms, in lieu of being secured over a closed duct, are secured to the duct over pre-formed openings in the duct with the duct constructed to alternatively receive the forms or outlet securing means whereby duct cutting and finishing operations are obviated.

Further and other objects of the present invention will be hereinafter set forth in the accompanying specification and claims and illustrated in the drawings which by way of illustration show what I now consider to be a preferred embodiment of my invention.

Fig. 1 is a perspective view of a section of duct or conduit with the improved plug in juxtaposition for attachment thereto;

Fig. 2 shows the improved plug secured to a duct and with concrete flooring over the duct and around the plug;

Fig. 3 shows a view similar to Fig. 2 but with the plug removed;

Fig. 4 shows an extension fitting secured to the duct and disposed in the pre-formed hole in the concrete;

Fig. 5 is a view similar to Fig. 4 but with a slight modification in the form of extension pipe securing means;

Fig. 6 is a modified form of plug with a diaphragm provided therein for supporting concrete in position therein; and Figs. 7 and 8 illustrate other different forms of plugs which may be used.

In more detail in the drawings, 10 in the various figures represents the duct or conduit or other underfloor conduit through which the wires are intended to be passed. The ducts 10 are provided at intervals with the openings 11 and adjacent the openings 11 are tapped holes 12 to receive fastening screws 13. These fastening screws are disposed in the bottom of plug shaped form members 14 which are preferably of conical configuration and provided with closed bottoms 15. In Fig. 2 a plug-shaped form 14 is shown secured to the duct 10 with the closed bottom portion 15 disposed over the opening 11 and with the screws 13 extending into the tapped holes of the duct. Concrete 16 is poured in place around the conical plug 14. 17 represents any suitable closure for the top of the plug-shaped form. Such closure may be disposed as shown or may be disposed flush with the top of the floor 16. When it is desired to provide an outlet opening at any point the plug-shaped form 14 is removed, such removal is affected by unscrewing the screws 13, access to the screws being provided through the hollow interior of the plug-shaped form. After the removal of the plug-shaped form the pre-formed opening 18 is left in the concrete 16 above the duct 10. Fig. 4 shows the next step wherein an extension fitting assemblage is applied to the duct. In this figure the part generally designated 19 is the adapter fitting part, this part being provided with lug portions which are suitably drilled to register with the tapped holes 12 of the duct and permit fastening screws 13a to be inserted so as to secure the adapter fitting 19 to the duct. The adapter fitting part 19 is provided with a through opening 20 preferably rounded off at the bottom as shown at 21 and tapped to receive a vertical standpipe 22. Adjacent the floor, a floor flange 23 may be provided to cover up the top of the conical pre-formed opening 18. It will be understood that part 22 constitutes the usual pipe portion of the extension fitting assemblage commonly called the standpipe.

According to the embodiment shown in Fig. 5, the adapter fitting part 19 here designated 19a, is tapped from top to bottom, the intermediate shoulder portion being omitted. In other respects the construction is similar to that shown in Fig. 4.

Fig. 6 shows a different form of plug form 14b. This plug form has a shouldered portion 25 spaced intermediate the top and closed bottom 15, which shouldered portion 25 is adapted to receive a collapsible diaphragm 26. The collapsible diaphragm 26 is adapted to support a mass of concrete 27 within the upper part of the plug form 14b and if desired the usual marker screws 28 may be provided.

Fig. 7 shows another embodiment of plug form here designated as 14c. This form is solid instead of being hollow as in the preceding described forms and long fastening screws 13b are provided for securing the same to the duct.

According to the embodiment shown in Fig. 8 the plug-shaped form 14d is made of sheet metal with a spiral configuration, which configuration permits screwing out of the form from the concrete instead of lifting out of the form as is the case with the other constructions.

With all of the various embodiments the plug-shaped forms are provided with securing means extending through tapped openings in the duct and the duct is provided with pre-formed openings 11. The arrangement is such that the duct is alternatively adapted to receive either a plug-shaped form or an extension fitting assemblage.

What I claim is:

1. A duct system including a buried conduit having a substantially flat undeformed upper wall portion provided with spaced openings therethrough for selectively receiving adapter fitting parts or removable plugs, removable plugs with flat bottom portions abutting the flat top of the duct around the spaced openings and screw fastening means extending through the flat bottoms of the plugs and engaging screw holes disposed in flat top of the duct slightly away from the foregoing openings therein, said screw holes being also adapted to receive screw fastenings for adapter fittings upon removal of the plugs, and adapter fittings shaped to extend into the duct openings and to also abut the top flat of the duct and to be secured thereto by the aforesaid last mentioned screw fastening means, said screw fastening means of each plug being disposed within the lateral peripheral wall of the plug and thereby accessible for unfastening operation without removal of flooring material exteriorly adjacent said peripheral wall.

2. A conduit system including a conduit provided with a plurality of openings therein, each opening having adjacent to and spaced from it threaded openings in the conduit wall, said threaded openings interchangeably receiving screw means for attaching plug-shaped forms which serve as closures for the other openings and which plug-shaped forms flatly abut at their bottoms the flat top wall of the conduit, and screw means for attaching extension fitting adapters which fit into an opening upon removal of a plug, said conduit system including one or more of said plug-shaped forms each having the aforesaid screw means removably attaching the form over a corresponding opening in the conduit, said screw means being disposed within the lateral peripheral wall of the form and thereby accessible for effecting removal of the form without removal of flooring material exteriorly adjacent said peripheral wall.

3. In an underfloor conduit system, in combination, a duct having an undeformed upper wall with an extension fitting adapter receiving opening therein, a plug for providing a pre-formed passage in the floor from said adapter opening to the floor surface, fastening screw means associated with the plug for removably securing the plug to the duct in said passage-providing relation, said undeformed duct wall having small openings adjacent to and outside of the said adapter receiving opening and said small openings including screw threads, for removably and interchangeably receiving the aforesaid fastening screw means of the plug and corresponding fastening screw means of an extension fitting adapter when the plug is removed, and said fastening screw means of the plug being disposed within the lateral peripheral wall of the plug and thereby accessible for removal of the plug, when the latter is secured to the duct.

4. The combination of claim 3 in which the plug is provided with a diaphragm disposed at a point intermediate the top and bottom of said plug.

JAMES M. G. FULLMAN.